United States Patent
Partridge et al.

(10) Patent No.: US 8,874,605 B2
(45) Date of Patent: *Oct. 28, 2014

(54) METHOD AND APPARATUS FOR AUTOMATICALLY INCORPORATING HYPOTHETICAL CONTEXT INFORMATION INTO RECOMMENDATION QUERIES

(75) Inventors: Kurt E. Partridge, Palo Alto, CA (US); Robert R. Price, Palo Alto, CA (US); Nicolas B. Ducheneaut, Sunnyvale, CA (US)

(73) Assignee: Palo Alto Research Center Incorporated, Palo Alto, AZ (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/028,020

(22) Filed: Feb. 15, 2011

(65) Prior Publication Data

US 2011/0137927 A1    Jun. 9, 2011

Related U.S. Application Data

(63) Continuation of application No. 12/021,623, filed on Jan. 29, 2008, now Pat. No. 7,904,530.

(51) Int. Cl.
*G06F 17/30* (2006.01)

(52) U.S. Cl.
USPC .......................................................... 707/767

(58) Field of Classification Search
CPC ................................................. G06F 17/30867
USPC .................................. 707/767; 706/21, 25, 45
See application file for complete search history.

(56) References Cited

U.S. PATENT DOCUMENTS

| | | | |
|---|---|---|---|
| 7,996,019 B2 * | 8/2011 | Kale et al. ................... | 455/456.3 |
| 2004/0214616 A1 | 10/2004 | Malcolm | |
| 2005/0096947 A1 * | 5/2005 | Fox et al. ............................ | 705/7 |
| 2007/0005419 A1 * | 1/2007 | Horvitz et al. ................... | 705/14 |
| 2008/0134042 A1 * | 6/2008 | Jankovich ....................... | 715/733 |
| 2009/0158342 A1 * | 6/2009 | Mercer et al. .................... | 725/46 |
| 2009/0171939 A1 * | 7/2009 | Athsani et al. ...................... | 707/5 |
| 2011/0208756 A1 * | 8/2011 | Shih et al. ...................... | 707/751 |
| 2011/0213676 A1 * | 9/2011 | Singh et al. .................. | 705/26.7 |
| 2011/0302188 A1 * | 12/2011 | Djabarov ....................... | 707/768 |

* cited by examiner

*Primary Examiner* — Belinda Xue
(74) *Attorney, Agent, or Firm* — Shun Yao; Park, Vaughan, Fleming & Dowler LLP

(57) ABSTRACT

A system facilitates automatically determining the hypothetical context information or the distribution of hypothetical contexts. During operation, the system receives a request from a user for one or more recommendations. The system also receives a current context substantially associated with the request. The system then determines a hypothetical context for the request, wherein the hypothetical context may be determined by considering several sources of information, including but not limited to the current context, past contexts, and relationships between the current context and past contexts. Next, the system determines one or more recommendations for the user based on the hypothetical context. Finally, the system returns the one or more recommendations to the user.

23 Claims, 5 Drawing Sheets

COMPUTING ENVIRONMENT 100

METHOD AND APPARATUS FOR AUTOMATICALLY INCORPORATING HYPOTHETICAL CONTEXT INFORMATION INTO RECOMMENDATION QUERIES

RELATED APPLICATION

The present patent is a continuation of, and hereby claims priority under 35 U.S.0 §120 to, pending U.S. patent application Ser. No. 12/021,623, entitled "Method and Apparatus for Automatically Incorporating Hypothetical Context Information into Recommendation Queries," by inventors Kurt E. Partridge, Robert R. Price, and Nicolas Ducheneaut, filed on 29 Jan. 2008.

BACKGROUND

1. Field of the Invention

The present invention relates to a recommender system. More specifically, the present invention relates to a recommender system incorporating hypothetical context information into recommendations.

2. Related Art

Users often use recommendation systems to discover items or locations that they might have trouble finding on their own. These recommendation systems only work well if they have preference information for the users. The more preference information the system has for a particular user, the more effective the recommendation typically is.

However, acquiring preference information can be difficult. Because there are many preferences, most users do not want to take time to specify them all. Furthermore, preferences may change depending on the context of use. In this case, the user may explicitly adjust their preferences using a mobile device, but user interface restrictions make this cumbersome. Finally, the user may be unaware of some preferences that he makes subconsciously.

Existing systems do use contextual data to adjust preferences automatically. For example, users generally prefer places near their current location. A mobile recommender system may show a list of places, sorted by proximity to the person. However, context-aware systems today only use the current context to modify preferences.

SUMMARY

One embodiment of the present invention provides a system that facilitates automatically determining the hypothetical context or the distribution of hypothetical contexts. During operation, the system receives a request from a user for one or more recommendations. The system also receives a current context substantially associated with the request. The system then determines a hypothetical context for the request, wherein the hypothetical context may be determined by considering several sources of information, including but not limited to the current context, past contexts, and relationships between the current context and past contexts. Note that the hypothetical context may comprise one or more future times and/or one or more future locations associated with the user, and a respective hypothetical context may contain a joint distribution over one or more contextual variables which can have discrete values, continuous values, and/or a combination of discrete and continuous values. Next, the system determines one or more recommendations for the user based on the hypothetical contexts. Finally, the system returns the one or more recommendations to the user. Note that a contextual variable represents one parameter in the context for a request.

Such contextual variables can include location, time, weather, venue type, other people that are involved in an activity, and optionally hidden variables that have been inferred by examining observable variables associated with previous requests.

In some embodiments of the present invention, determining the one or more hypothetical contexts involves: constructing a mapping function; applying the mapping function to the current context; and producing a hypothetical context as an output of the mapping function In some embodiments of the present invention, the mapping function is determined by machine learning methods based on one or more of the following data sources: prior contexts associated with prior user requests; prior hypothetical contexts which are derived in association with prior user requests, the mapping relationship between the prior contexts and corresponding prior hypothetical contexts associated with the same prior user requests, and user interaction associated with prior user requests for recommendation.

In some embodiments of the present invention, determining the a respective hypothetical context involves: estimating a distribution over time, estimating a distribution over locations, determining a distribution over weather conditions for the distribution over locations and distribution over time, determining a distribution over context-related preferences, and/or determining a distribution over conditions related to the hypothetical context that may be inferred from publicly-available data about distribution over other contextual variables.

In some embodiments of the present invention, while estimating the distribution over time, the system examines one or more prior user requests associated with the location of the current context. The system also determines the context associated with each prior user request and the hypothetical context which has been derived in association with each prior user request. The system further determines a mapping from the current context to the time distribution of the corresponding hypothetical context, wherein determining the mapping can involve producing a time distribution based on the time associated with the current context and/or producing a time distribution based on the time associated with a calendar entry. The system then constructs a mapping function based on the determined mapping, and applies the mapping function to the current context to determine the distribution over time of the hypothetical context.

In some embodiments of the present invention, estimating the distribution over locations involves collecting a set of candidate locations from location distributions that the user has previously specified and/or locations that the user has previously visited. The set of candidate locations can optionally exclude: candidate locations that have not been visited more than a predetermined number of times, location distributions that have not been specified more than a predetermined number of times, location distributions that were not specified during a time interval derived from the time associated with the current context, and/or candidate locations that were not visited during one or more time periods corresponding to the time distribution associated with the hypothetical context. The system further determines a distribution over locations from the set of candidate locations or one or more statistics of the set of candidate locations. For example, such statistics may be based on the mean, median, mode, maximum, minimum, last item, or first item of the candidate locations.

In some embodiments of the present invention, the statistics of the set of candidate locations are determined based on the type of venue closest to a respective candidate location. Furthermore, the distribution over locations can include locations not in the set of candidate locations but related to the type of venue of at least one candidate location.

In some embodiments of the present invention, determining the hypothetical context involves retrieving from a calendar a context whose associated time period substantially matches the time distribution of the hypothetical context. The system sets the other variables of hypothetical context to the variables of the context retrieved from the calendar.

In some embodiments of the present invention, determining the weather condition distribution can involve performing a lookup to determine a distribution over forecasted weather conditions corresponding to the distribution of location and time.

In some embodiments of the present invention, the system saves the hypothetical context to a calendar to facilitate subsequent hypothetical context determinations.

In some embodiments of the present invention, the system presents the hypothetical context to the user, receives a change to the hypothetical context from the user, and applies the change to the hypothetical context.

DETAILED DESCRIPTION

Figure 1:
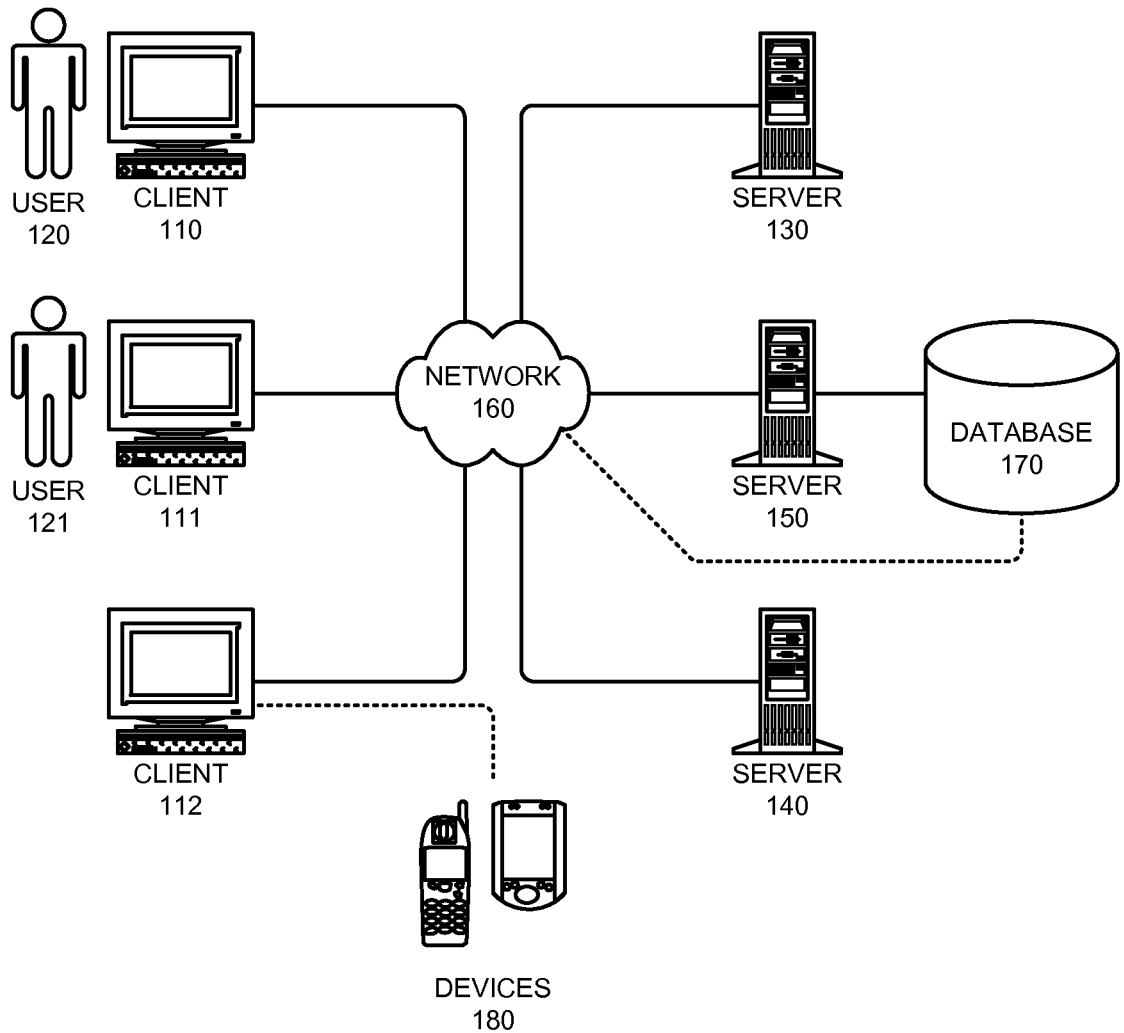
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

When users perform an information-retrieval task, it is often helpful to supplement their query with additional contextual information. For example, if a user is searching for a Mexican Restaurant, he might prefer that the responses include restaurants that are: in a part of town that he usually frequents in the evening, at a price range common to his habits, and that are open late because he usually stays late. However, specifying all these search terms in a single query is difficult because it requires providing the system with a significant amount of information. Moreover, it may require a complex user interface to specify all the combinations of query parameters for all types of queries that the user may want to make.

Embodiments of the present invention provide a context-aware recommendation system which accommodates the situation where a user does not necessarily want recommendations that pertain to their immediate context. For example, if he is at work late on a Wednesday and wants to plan for a fun activity on the weekend, recommendations for things to do late on a Wednesday near his work location might not be what he wants. Instead, the user may be looking for recommendations pertaining to a specific context. In the text below, this specific, desired context is called a "hypothetical context."

Note that a hypothetical context is not limited to specific points in space or a specific time. It could specify a region of space, or several regions in space. It could specify an interval of time, or several intervals of time. Neither the space nor the time intervals need be contiguous. For example, a general representation for a hypothetical context is a joint distribution, which can specify dependent relationships between space, time, and any other variables that are included in the hypothetical context. A joint distribution also specifies a probability density (or probability mass in the case of discrete variables) that allows different variable values (such as regions or intervals) to have more weight than other regions. This affects how the hypothetical context can be used when making recommendations. For instance, a recommendation can be more likely to be appropriate for values with high weight than with low weight.

A user could explicitly describe the hypothetical context to a recommendation system, say by clicking on a map location, entering a time, and providing other contextual factors such as weather, social group, emotional state, etc. However, it is likely to be difficult and time-consuming to adjust all these parameters appropriately, particularly on a mobile device with a small physical interface.

Embodiments of the present invention provide a process by which contextual data about the user's query may be determined automatically. These embodiments take advantage of the user's current context (location, time of day, day of week, calendar information, weather condition, etc.), as well as the user's contextual history. Note that the term "context" used herein refers to not only information associated with the user's behavior, but also information about the physical environment, such as time, location, and weather. The output of the process is a hypothetical context, which is the most likely context, or a probability distribution over possible contexts. This output may be used to inform a later stage process that searches for the best recommendations to satisfy the query given the predicted contextual information.

One embodiment of the present invention provides a system that facilitates automatically incorporating hypothetical context information into recommendations for a user. During operation, the system receives a request from a user for a recommendation. The system then determines a hypothetical context for the request, wherein the hypothetical context may be determined from a current context. Note that the hypothetical context may comprise a time, location, distribution over times, and/or distribution over locations. Next, the system determines a recommendation for the user based on the hypothetical context. Finally, the system returns the recommendation to the user.

Note that returning the recommendation to the user may involve returning a list of items to the user, wherein the list may be sorted based on criteria derived from the hypothetical context.

In one embodiment, the system automatically determines the mapping from a context associated with a query to a hypothetical context through a machine-learning mechanism. The input to the machine-learning mechanism comprises previous contexts associated with a query and the related previous hypothetical contexts. The previous hypothetical contexts may have been determined automatically or by explicit user interaction with the system. From these inputs, the machine-learning mechanism constructs the mapping that can then be applied to a new input situation to compute a hypothetical context.

In some embodiments of the present invention, determining the hypothetical context involves: estimating a distribution of times, estimating a distribution over locations, determining distribution of a weather conditions, determining a distribution of context-related preferences, and determining a distribution of conditions related to the current context that may be inferred from publicly-available data corresponding to the joint distribution of the other variables.

In one embodiment of the present invention, if there are insufficient prior queries to determine a mapping from the context associated with the query to the hypothetical context, a default hypothetical context may be constructed. For example, if a user requests information for a location that he has never been to, or has only made limited visits to, the system may infer that the user is probably asking for immediate information and may set the period of time for the hypothetical context to the current time, or a time just beyond the current time (such as 15 minutes in the future). However, if the user is asking for information for a location that they have asked about many times before, such as near the user's home or work, then the user is probably inquiring under the assumption of a different context, such as at a future time or for a different location.

Note that in some embodiments of the present invention, the system makes a recommendation or a series of recommendations after determining the hypothetical context, while in other embodiments of the present invention, the system passes the determined hypothetical context to a recommendation engine.

In some embodiments of the present invention, estimating the distribution over time involves: examining previous requests associated with the location, determining previous contexts for the request, and determining previous times set by the user during the previous requests.

For example, if all of the previous requests were set to the weekend, the system would set the current hypothetical context time to the weekend. Furthermore, the system can set the hypothetical context time in relation to other events on the user's calendar. For example, if previous hypothetical context times were set immediately preceding an unusual event on the user's calendar, then the system can set the hypothetical context time immediately preceding an upcoming unusual event on the user's calendar.

Note that in some embodiments of the present invention, calendar items and hypothetical contexts can be scanned and indexed during an idle time to facilitate faster lookups.

In some embodiments of the present invention, estimating the distribution over locations involves collecting a set of candidate locations from location distributions that the user has previously specified and/or locations that the user has previously visited. The set of candidate locations can optionally exclude: candidate locations that have not been visited more than a predetermined number of times, location distributions that have not been specified more than a predetermined number of times, location distributions that were not specified during a time interval derived from the time associated with the current context, and/or candidate locations that were not visited during one or more time periods corresponding to the time distribution associated with the hypothetical context. The system further determines a distribution over locations from the set of candidate locations or one or more statistics of the set of candidate locations. For example, such statistics may be based on the mean, median, mode, maximum, minimum, last item, or first item of the candidate locations. In some embodiments of the present invention, the system may leverage addresses from the user's address book to help determine the hypothetical context location.

In some embodiments of the present invention, determining the hypothetical context involves retrieving from a calendar a context whose associated time period substantially matches the time distribution of the hypothetical context. The system sets the other variables of the hypothetical context to the variables of the context retrieved from the calendar. In other embodiments, the system looks for common keywords between future events and past events with known locations to determine the hypothetical context.

Note that in some embodiments of the present invention, the system stores a hypothetical context with each calendar entry to facilitate the creation of future hypothetical contexts.

In some embodiments of the present invention, determining the weather condition distribution can involve performing a lookup to determine a distribution over forecasted weather conditions corresponding to the distribution of location and time.

In some embodiments, the system determines the recommendation for the user based on the hypothetical context and the current context. For example, if the system determines that the user is currently on a subway train (possibly based on input from a GPS-device), the system can determine previous hypothetical contexts set while the user was on the subway to aid in determining the current hypothetical context. In these embodiments, the specific location may not be as important as the general category of the location.

In some embodiments, the system determines a current location of the user. The system then determines the recommendation for the user based on the hypothetical context and the current location. Note that the current location may not represent a point, but could represent an entire homogenous area. For example, if the system determines that the current location associated with the user is on a college campus, then the system may combine all of the previous query data that include locations on the college campus to aid in determining the current hypothetical context.

In some embodiments, the system saves the hypothetical context along with a calendar entry to facilitate subsequent hypothetical context determinations.

In some embodiments, the system presents the hypothetical context to the user, receives a change to the hypothetical context from the user, and applies the change to the hypothetical context. For example, the system might present the user with a suggested hypothetical context and allow the user to make changes. Note that this can be done in a manner that is not intrusive to the user, such that the user may choose to simply ignore the suggested hypothetical context.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112. Devices 180 can include touch-sensitive displays that provide both an input mechanism for the device, as well as an output mechanism for displaying information to users 120 and 121.

Note that different embodiments of the present invention may use different configurations, and are not limited to the configuration illustrated in computing environment 100.

Automatically Incorporating a Hypothetical Context into a Recommendation

Figure 2:
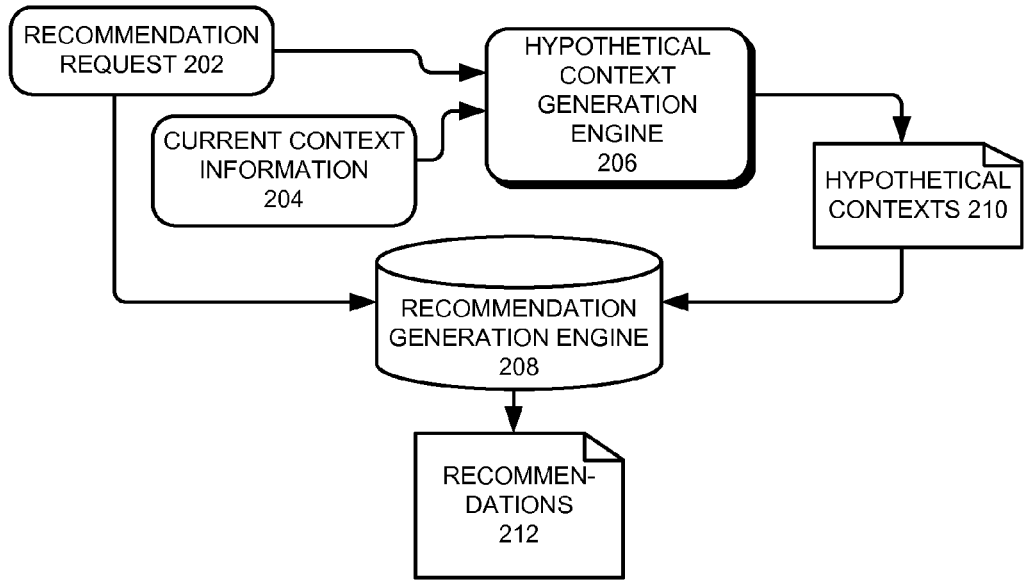
FIG. 2 illustrates an exemplary recommendation system based on hypothetical contexts in accordance with an embodiment of the present invention.

FIG. 2 illustrates an exemplary recommendation system based on hypothetical contexts in accordance with an embodiment of the present invention. When the system receives a recommendation request 202 from a user, the system provides recommendation request 202 to a hypothetical context generation engine 206. Context generation engine 206 also takes as input a set of current context information 204, which in one embodiment can include time of day, day of week, the user's location, the current weather, the content of the user's calendar, keywords extracted from the user's emails or instant messages, etc. Note that the user might also provide some preference information with recommendation request 202. Based on recommendation request 202 and current context information 204, hypothetical context generation engine 206 generates a set of hypothetical contexts 210. Note that hypothetical context 210 may indicate a different location, different time, or user preference information which can be used to recommend activities to the user. In some cases, hypothetical contexts 210 can also be a probability distribution of different contextual values.

Based on hypothetical contexts 210 and recommendation request 202, a recommendation generation engine 208 generates a set of recommendations 212. For example, recommendations 212 may include activities or venues associated with a future time or a location that is different from the user's current location. In other words, the system can predict the user's preferences outside the scope of the current contexts by using hypothetical contexts.

Figure 3:
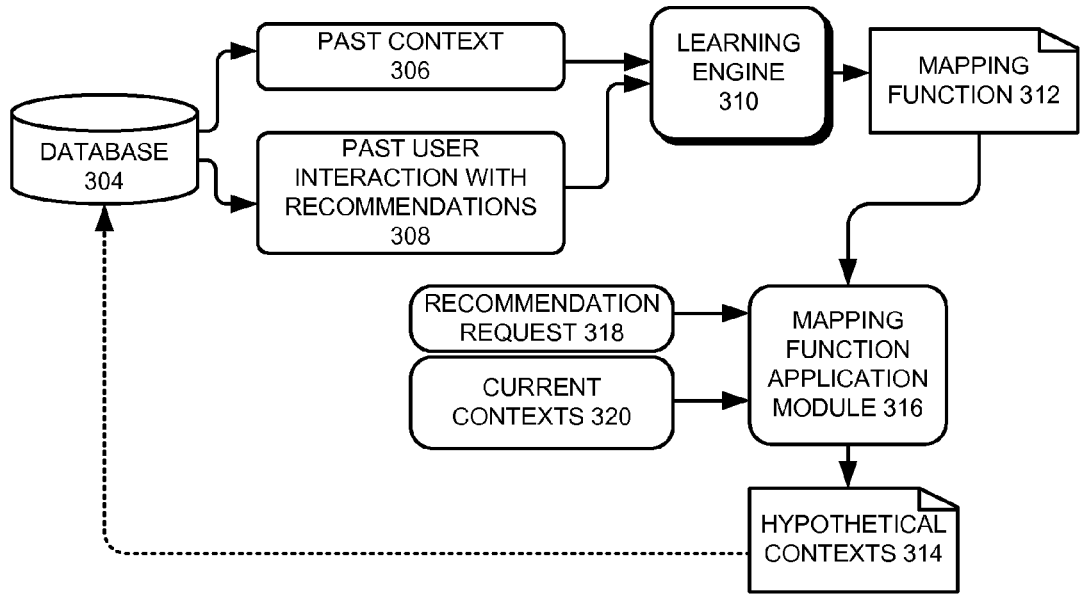
FIG. 3 presents an exemplary block diagram illustrating the operation of a hypothetical context generation engine in accordance with an embodiment of the present invention.

In one embodiment, the hypothetical context generation engine can include a machine-learning mechanism which constructs a mapping function from the current contextual information to hypothetical contexts. FIG. 3 presents an exemplary block diagram illustrating the operation of a hypothetical context generation engine in accordance with an embodiment of the present invention. In this example, a learning engine 310 which is capable of constructing the mapping function from current contexts to hypothetical contexts.

In one embodiment, learning engine 310 has two inputs. One input includes past context information 306 and the second input includes past user interaction with recommendations 308. Note that past context 306 and past user interaction with the system 308 are associated with past instances of the user's recommendation requests. In one embodiment, the user's past recommendation requests, the corresponding contextual information at the time of the request, and the prior or subsequent user interaction associated with that recommended request (e.g., preference information provided by the user and/or the user's selection of recommendations) are stored in a database 304.

Based on these inputs, learning engine 310 constructs a mapping function 312. Note that learning engine 310 can use various machine-learning techniques in constructing mapping function 312. Such techniques include, but are not limited to, rule-based learning, nearest-neighbor approaches, kernel methods, Bayesian networks, and hierarchical hidden Markov models. Similarly, mapping function 312 can be a set of deterministic rules or a set of probability distributions as a function of the input contextual information.

A mapping function application module 316 applies mapping function 312 to a set of current contexts 320 based on a user recommendation request 318. Note that user recommendation request 318 may or may not specify certain contextual values, such as time and/or location. As a result, mapping function application module 316 produces a set of hypothetical contexts 314, which in one embodiment include a labeled set of output features. Hypothetical contexts 314 can then be used by the recommendation generation engine to produce a list of recommendations. Note that hypothetical contexts 314 and subsequent user interaction with the system are stored in database 304 to allow learning engine 310 to adjust mapping function 312 in the future.

The description below in conjunction with the exemplary processes illustrated in FIGS. 4-7 is not limited to any specific method for constructing a mapping function from the current contexts to the hypothetical contexts. The system can use a deterministic rule based approach, or any machine-learning techniques such as those listed above.

Figure 4:
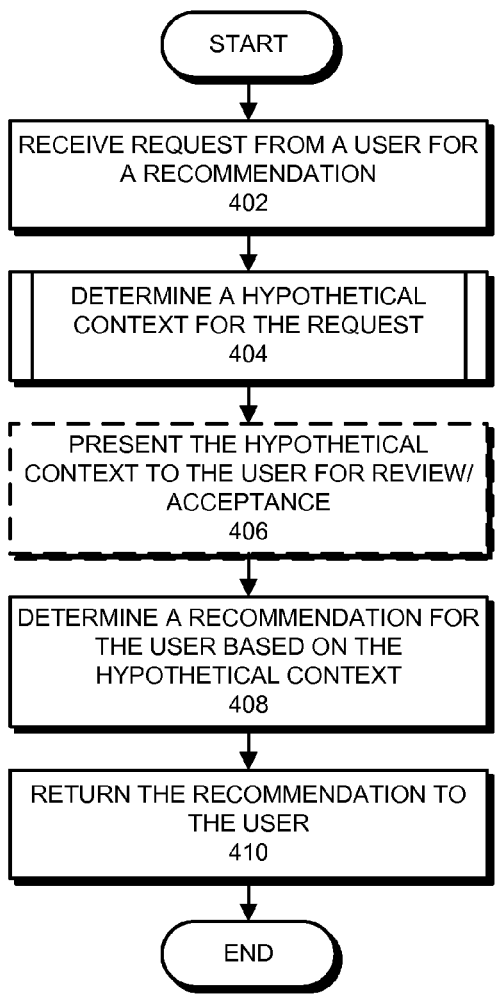
FIG. 4 presents a flow chart illustrating the process of automatically incorporating a hypothetical context into recommendation queries in accordance with an embodiment of the present invention.

FIG. 4 presents a flow chart illustrating the process of automatically incorporating a hypothetical context into recommendation queries in accordance with an embodiment of the present invention.

During operation, the system receives a request from a user, such as user 120, for a recommendation, wherein the request comprises at least one query parameter (operation 402). The system then determines a hypothetical context for the request from a current context (operation 404). Note that the hypothetical context may comprise a future time and/or a future location associated with the user.

In some embodiments of the present invention, the system presents the hypothetical context to user 120 for review and/or acceptance prior to making the recommendation (operation 406). Next, the system determines a recommendation for user 120 based on the query parameter and the hypothetical context (operation 408). Finally, the system returns the recommendation to the user (operation 410).

Determining a Hypothetical Context

Figure 5:
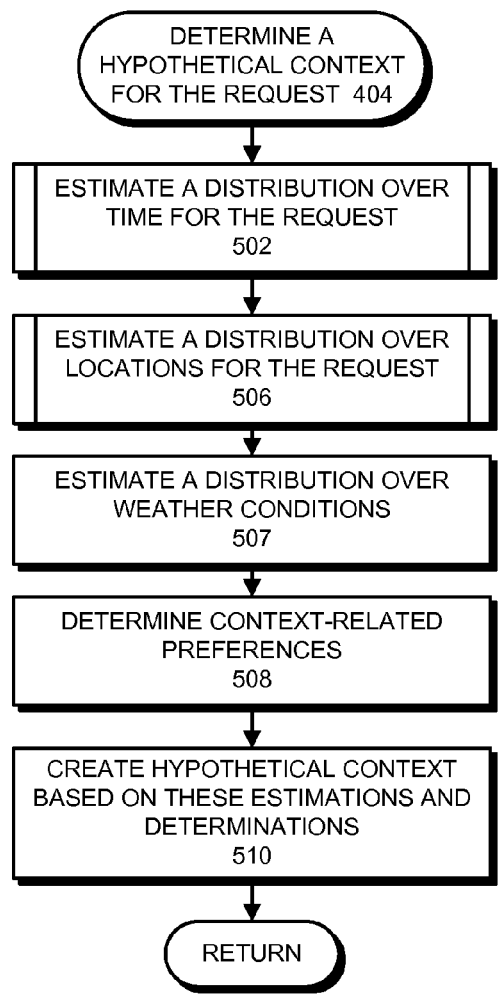
FIG. 5 presents a flow chart illustrating an exemplary process of determining a hypothetical context in accordance with an embodiment of the present invention.

FIG. 5 presents a flow chart illustrating an exemplary process of determining a hypothetical context in accordance with an embodiment of the present invention.

During operation, the system determines the hypothetical context by estimating distributions over several variables. In this example, the system estimates a distribution over period over time for the request (operation 502). The system further estimates a distribution over locations for the request (operation 506). Optionally, the system can also estimate a distribution over weather conditions (operation 507). In addition, the system determines context-related preferences (operation 508). The system then creates a hypothetical context based on these estimations and determinations (operation 510). Note that the aforementioned operations can be performed in any order.

Estimating the Period of Time

Figure 6:
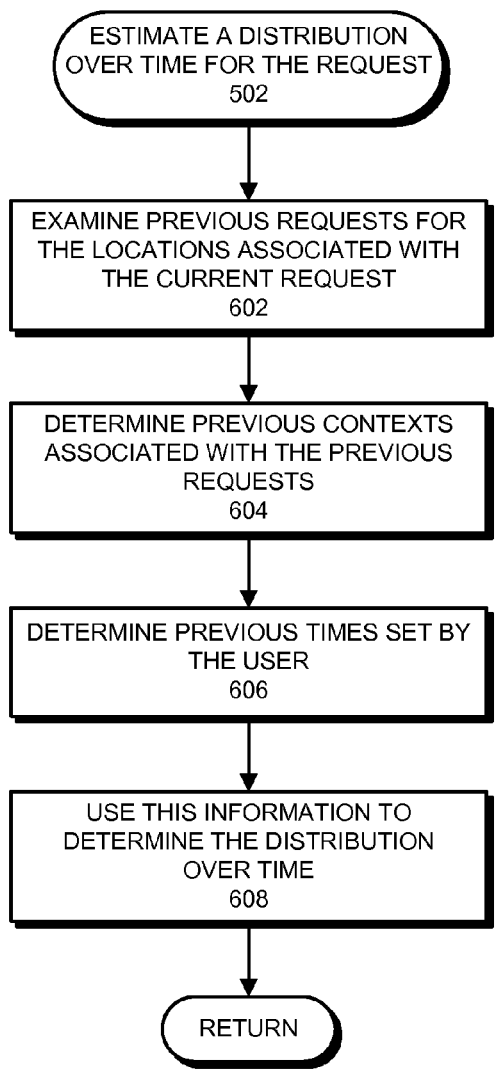
FIG. 6 presents a flow chart illustrating an exemplary process of estimating the period of time in accordance with an embodiment of the present invention.

FIG. 6 presents a flow chart illustrating an exemplary process of estimating the distribution over time in accordance with an embodiment of the present invention.

During operation, the system examines previous requests for the locations associated with the current request (operation 602). The system then determines previous contexts associated with the previous requests (operation 604), and determining previous times set by the user (operation 606). Subsequently, the system uses this information to determine the distribution over time (operation 608).

Note that in one embodiment the system searches for patterns in time. For example, if previous uses of the recommendation system showed that the user generally made queries at 8 am for that evening, the system can learn this time pattern. Next time when the user makes a query at 8 am, the system sets the time of the hypothetical context for that evening. The hypothetical context generation engine can encode this time shift by setting a time difference between the current time and the hypothetical-context time.

Other time patterns in additional to intra-day time differences can also be captured. For example, at 8 am on a weekday, the user always wants to know what to do on Saturday afternoon. In this case, the output of the hypothetical context generation engine is encoded as a time difference between the start of the week and the time the user is interested in. This could be incorporated into a machine-learning framework by predicting two time output variables, one relative to the input time, and the second relative to the start of the week. Additional time variables can also be included, such as time relative to the start of the day, time relative to a particular event, etc. Furthermore, the system can indicate which time output variable has the highest likelihood of being correct.

Estimating the Location

Figure 7:
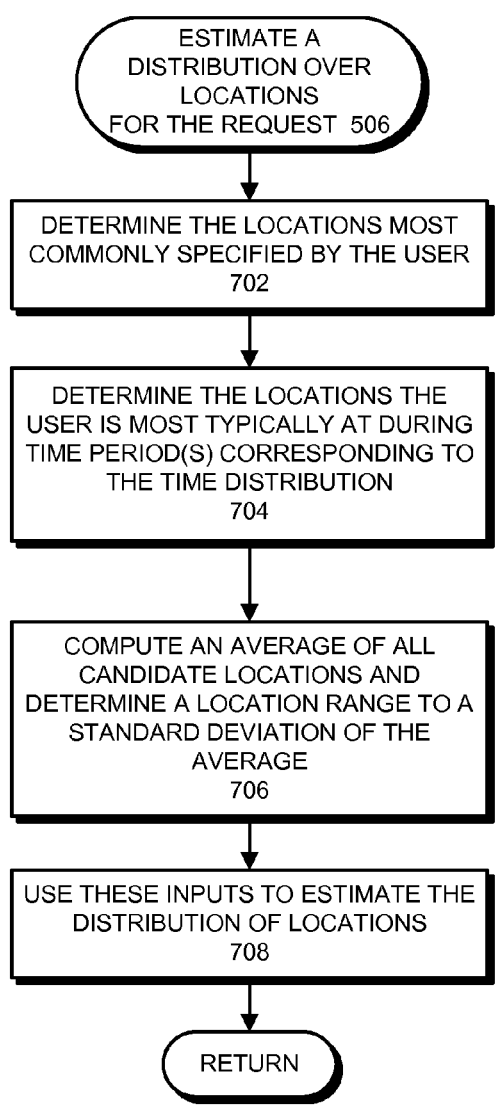
FIG. 7 presents a flow chart illustrating an exemplary process of estimating the location in accordance with an embodiment of the present invention.

FIG. 7 presents a flow chart illustrating an exemplary process of estimating the distribution over locations in accordance with an embodiment of the present invention.

During operation, the system first determines the locations most commonly specified by the user (operation 702). The system then determines the locations the user is most typically at during time period(s) corresponding to the time distribution (operation 704). Next, the system computes an average of all candidate locations and sets a location range to a standard deviation of the average (operation 706). The system then uses these inputs to estimate the distribution over locations (operation 708). Note that the example illustrated in FIG. 7 is only one of many e ways to compute the location distribution. Other approaches are also possible.

Exemplary Computer and Communication System

Figure 8:
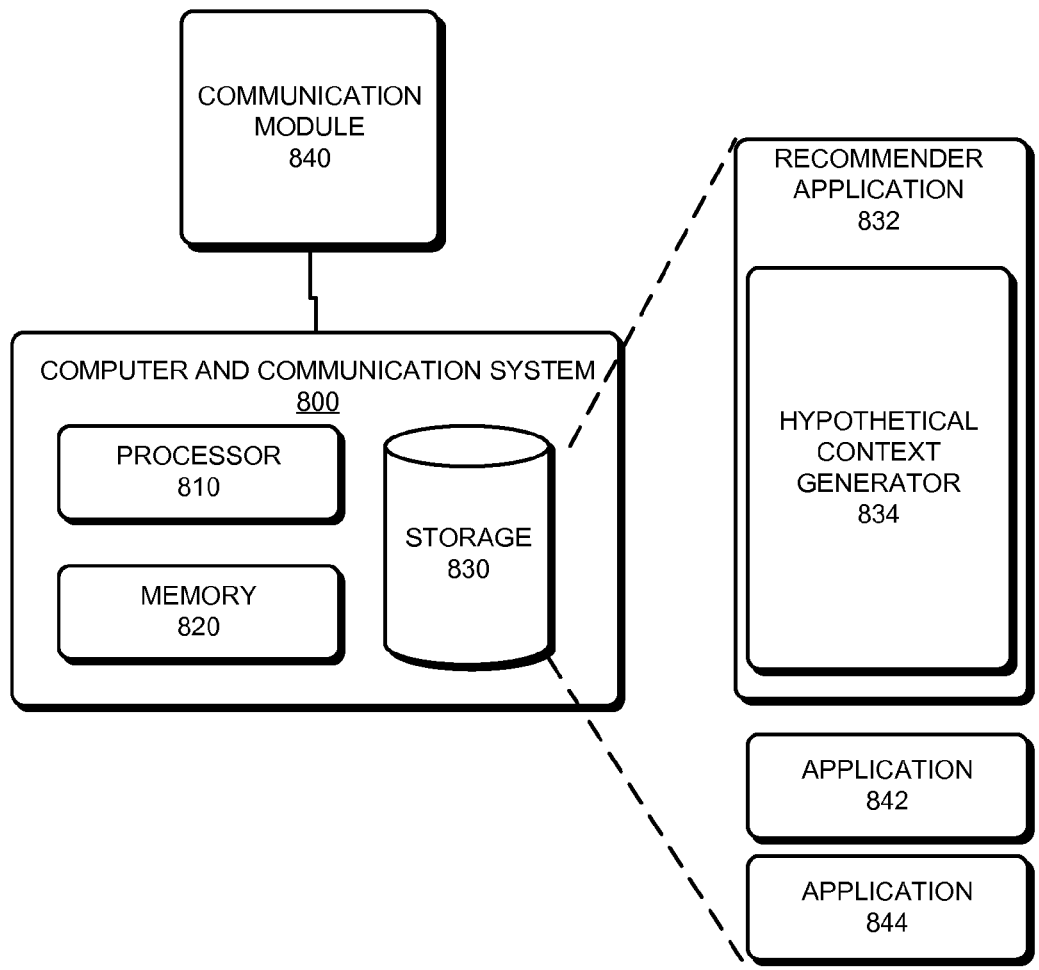
FIG. 8 illustrates an exemplary computer and communication system which facilitates determining a hypothetical context in accordance with the present invention.

FIG. 8 illustrates an exemplary computer and communication system which facilitates determining a hypothetical context in accordance with the present invention. A computer and communication system 800 is coupled to a communication module 840, and includes a processor 810, a memory 820, and a storage device 830. Storage device 830 stores a number of applications, such as applications 842 and 844. Storage device 830 also stores a recommender application 832, which includes a hypothetical context generator 834.

During operation, recommender application 832 is loaded from storage device 830 into memory 820, and then executed by processor 810 to recommend leisure activities to a user.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   receiving, by a computing device, a request from a user for one or more recommendations;
   determining a location distribution from historical location information associated with the user, wherein the location distribution indicates one or more probability distributions for one or more locations;
   determining a time distribution from historical context information associated with the user, wherein the time distribution indicates one or more probability distributions for one or more contexts, wherein a respective context includes contextual variables corresponding to at least one of: a location; a time; a weather condition; and a venue type;
   determining a joint distribution of two or more of the contextual variables that are based on the location distribution and the time distribution, wherein the joint distribution comprises statistical attributes that characterize dependent relationships between the two or more of the contextual variables, the statistical attributes including one or more of: a mean value; a median value; a mode; a maximum value; and a minimum value of the contextual variables;
   determining a hypothetical context based on the statistical attributes of the joint distribution and a current context, wherein the hypothetical context indicates one or more user preferences that are outside of the user's current context and explicit historical contexts;

producing one or more recommendations for the user based on the hypothetical context;

constructing a mapping function that maps a user context to a hypothetical context, wherein constructing the mapping function involves using one or more of: historical contexts associated with the request; prior hypothetical contexts; and the user's interactions associated with the user's past requests for a recommendation; and providing the one or more recommendations to the user.

2. The method of claim 1, wherein determining the hypothetical context comprises:

applying the mapping function to a current context; and producing the hypothetical context as an output of the mapping function.

3. The method of claim 2, wherein the construction of the mapping function is also based on a mapping relationship between the historical contexts and corresponding prior hypothetical contexts.

4. The method of claim 1, wherein determining a respective hypothetical context comprises one or more of:

determining a weather-condition distribution for the location distribution and the time distribution;

determining a distribution over context-related preferences; and determining a distribution over conditions related to the hypothetical context that may be inferred from publicly-available data about the distribution over other contextual variables.

5. The method of claim 4, wherein determining the weather-condition distribution includes performing a lookup to determine a distribution over forecasted weather conditions corresponding to the location distribution and the time distribution.

6. The method of claim 1, wherein determining the time distribution comprises one or more of:

examining one or more prior user requests associated with the location of the current context;

determining the context associated with each prior user request;

determining the hypothetical context associated with each prior user request;

determining a mapping from the current context to the time distribution of the corresponding hypothetical context, wherein determining the mapping involves producing a time distribution based on the time associated with the current context and/or producing a time distribution based on the time associated with a calendar entry;

constructing a mapping function based on the determined mapping; and applying the mapping function to the current context to determine the time distribution.

7. The method of claim 1, wherein estimating the location distribution comprises:

collecting a set of candidate locations from location distributions that the user has previously specified and/or locations that the user has previously visited, excluding one or more of:

candidate locations that have not been visited more than a predetermined number of times;

location distributions that have not been specified more than a predetermined number of times;

location distributions that were not specified during a time interval derived from the time associated with the current context; and candidate locations that were not visited during one or more time periods corresponding to the time distribution associated with the hypothetical context; and determining a distribution over locations from the set of candidate locations or one or more statistics of the set of candidate locations.

8. The method of claim 7, wherein the statistics of the set of candidate locations are determined in part from the type of venue associated with each candidate location; and wherein the location distribution includes locations not in the set of candidate locations but related to the type of venue of at least one candidate location.

9. The method of claim 1, wherein determining the hypothetical context involves:

retrieving from a calendar a context whose associated time period substantially matches the time distribution of the hypothetical context; and setting other variables of the hypothetical context to the variables of the context retrieved from the calendar.

10. The method of claim 1, further comprising saving the hypothetical context to a calendar to facilitate subsequent hypothetical context determinations.

11. The method of claim 1, further comprising:

presenting the hypothetical context to the user;

receiving a change to the hypothetical context from the user; and applying the change to the hypothetical context.

12. A computer-readable non-transitory storage medium storing instructions that when executed by a computer cause the computer to perform a method, the method comprising:

receiving a request from a user for one or more recommendations;

determining a location distribution from historical location information associated with the user, wherein the location distribution indicates one or more probability distributions for one or more locations;

determining a time distribution from historical context information associated with the user, wherein the time distribution indicates one or more probability distributions for one or more contexts, wherein a respective context includes contextual variables corresponding to at least one of: a location; a time; a weather condition; and a venue type;

determining a joint distribution of two or more of the contextual variables that are based on the location distribution and the time distribution, wherein the joint distribution comprises statistical attributes that characterize dependent relationships between the two or more of the contextual variables, the statistical attributes including one or more of: a mean value; a median value; a mode; a maximum value; and a minimum value of the contextual variables;

determining a hypothetical context based on the statistical attributes of the joint distribution and a current context, wherein the hypothetical context indicates one or more user preferences that are outside of the user's current context and explicit historical contexts;

producing one or more recommendations for the user based on the hypothetical context;

constructing a mapping function that maps a user context to a hypothetical context, wherein constructing the mapping function involves using one or more of: historical contexts associated with the request; prior hypothetical contexts; and the user's interactions associated with the user's past requests for a recommendation; and providing the one or more recommendations to the user.

13. The computer-readable non-transitory storage medium of claim 12, wherein determining the hypothetical context comprises:

applying the mapping function to a current context; and producing the hypothetical context as an output of the mapping function.

14. The computer-readable non-transitory storage medium of claim 13, wherein the construction of the mapping function is also based on a mapping relationship between the historical contexts and corresponding prior hypothetical contexts.

15. The computer-readable non-transitory storage medium of claim 12, wherein determining a respective hypothetical context comprises one or more of:
    determining a weather-condition distribution for the location distribution and the time distribution;
    determining a distribution over context-related preferences; and
    determining a distribution over conditions related to the hypothetical context that may be inferred from publicly-available data about the distribution over other contextual variables.

16. The computer-readable non-transitory storage medium of claim 15, wherein determining the weather-condition distribution includes performing a lookup to determine a distribution over forecasted weather conditions corresponding to the location distribution and the time distribution.

17. The computer-readable non-transitory storage medium of claim 12, wherein determining the time distribution comprises one or more of:
    examining one or more prior user requests associated with the location of the current context;
    determining the context associated with each prior user request;
    determining the hypothetical context associated with each prior user request;
    determining a mapping from the current context to the time distribution of the corresponding hypothetical context, wherein determining the mapping involves producing a time distribution based on the time associated with the current context and/or producing a time distribution based on the time associated with a calendar entry;
    constructing a mapping function based on the determined mapping; and
    applying the mapping function to the current context to determine the time distribution.

18. The computer-readable non-transitory storage medium of claim 12, wherein estimating the location distribution comprises:
    collecting a set of candidate locations from location distributions that the user has previously specified and/or locations that the user has previously visited, excluding one or more of:
        candidate locations that have not been visited more than a predetermined number of times;
        location distributions that have not been specified more than a predetermined number of times;
        location distributions that were not specified during a time interval derived from the time associated with the current context; and
        candidate locations that were not visited during one or more time periods corresponding to the time distribution associated with the hypothetical context; and
    determining a distribution over locations from the set of candidate locations or one or more statistics of the set of candidate locations.

19. The computer-readable non-transitory storage medium of claim 18, wherein the statistics of the set of candidate locations are determined in part from the type of venue associated with each candidate location; and wherein the location distribution includes locations not in the set of candidate locations but related to the type of venue of at least one candidate location.

20. The computer-readable non-transitory storage medium of claim 12, wherein determining the hypothetical context involves:
    retrieving from a calendar a context whose associated time period substantially matches the time distribution of the hypothetical context; and
    setting other variables of the hypothetical context to the variables of the context retrieved from the calendar.

21. The computer-readable non-transitory storage medium of claim 12, wherein the method further comprises saving the hypothetical context to a calendar to facilitate subsequent hypothetical context determinations.

22. The computer-readable non-transitory storage medium of claim 12, wherein the method further comprises:
    presenting the hypothetical context that is obtained from estimations and determinations of time, location and weather-condition distributions, to the user;
    receiving a change to the hypothetical context from the user; and
    applying the change to the hypothetical context.

23. An apparatus, comprising:
    a processor;
    a memory;
    a request receiving mechanism configured to receive a request from a user for one or more recommendations;
    a location estimation mechanism configured to determine a location distribution from historical location information associated with the user, wherein the location distribution indicates one or more probability distributions for one or more locations;
    a time estimation mechanism configured to determine a time distribution from historical context information associated with the user, wherein the time distribution indicates one or more probability distributions for one or more contexts, wherein a respective context includes contextual variables corresponding to at least one of: a location; a time; a weather condition; and a venue type;
    a joint distribution estimation mechanism configured to determine a joint distribution of two or more of the contextual variables that are based on the location distribution and the time distribution, wherein the joint distribution comprises statistical attributes that characterize dependent relationships between the two or more of the contextual variables, the statistical attributes including one or more of: a mean value; a median value; a mode; a maximum value; and a minimum value of the contextual variables;
    a hypothetical context estimation mechanism configured to determine a hypothetical context based on the statistical attributes of the joint distribution and a current context, wherein the hypothetical context indicates one or more user preferences that are outside of the user's current context and explicit historical contexts;
    a learning mechanism configured to construct a mapping function that maps a user context to a hypothetical context, wherein constructing the mapping function involves using one or more of: historical contexts associated with the request; prior hypothetical contexts; and the user's interactions associated with the user's past requests for a recommendation; and
    a recommendation mechanism configured to produce one or more recommendations for the user based on the hypothetical context, and to provide the one or more recommendations to the user.

* * * * *